J. M. CASE.
TRAIN ORDER HOLDER.
APPLICATION FILED DEC. 12, 1911.
1,025,861.
Patented May 7, 1912.
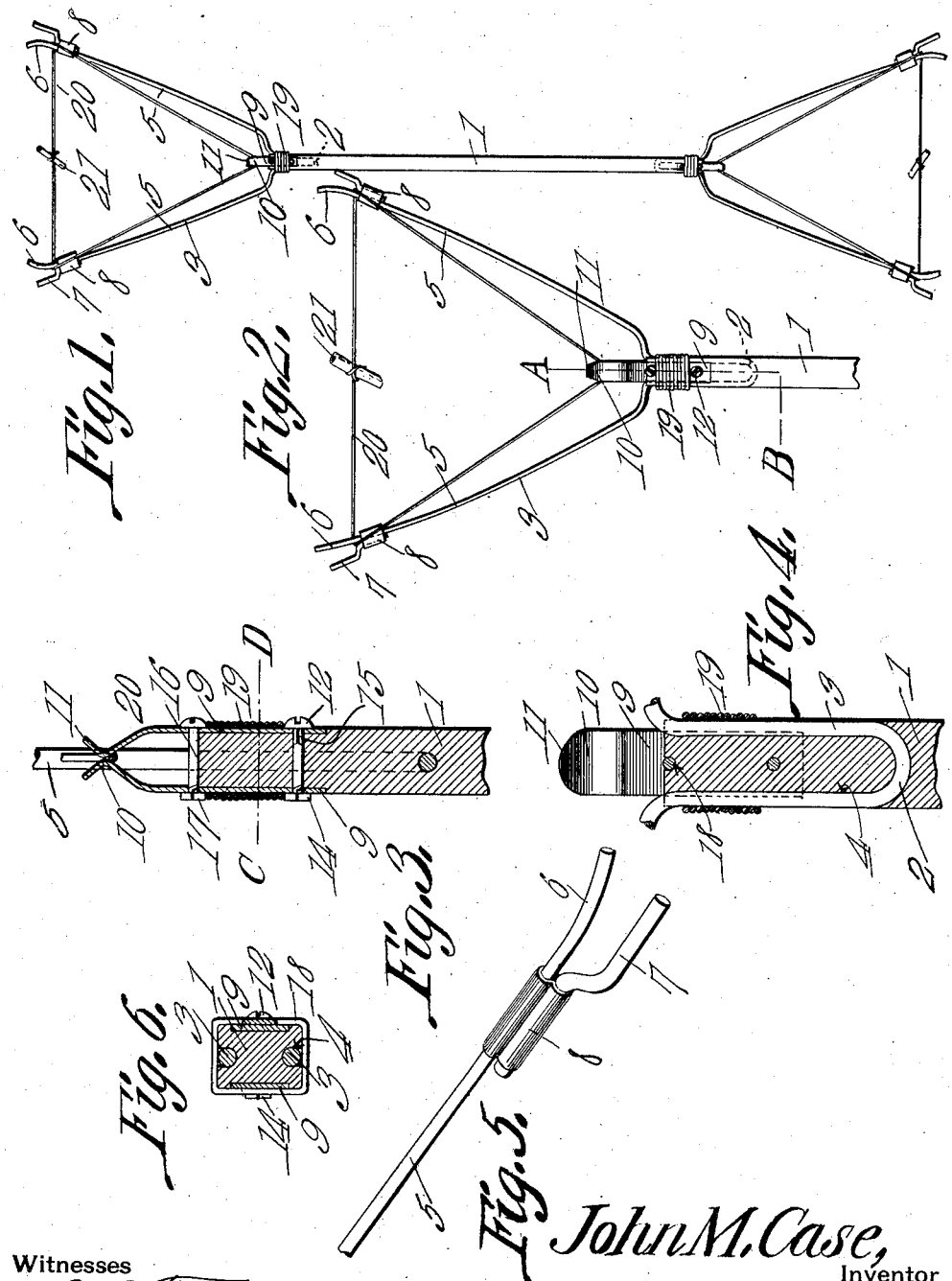
Witnesses
John M. Case,
Inventor
by
Attorneys

UNITED STATES PATENT OFFICE.

JOHN MARTIN CASE, OF OSAWATOMIE, KANSAS.

TRAIN-ORDER HOLDER.

1,025,861.  Specification of Letters Patent.  Patented May 7, 1912.

Application filed December 12, 1911. Serial No. 665,407.

*To all whom it may concern:*

Be it known that I, JOHN M. CASE, a citizen of the United States, residing at Osawatomie, in the county of Miami and State of Kansas, have invented a new and useful Train-Order Holder, of which the following is a specification.

The present invention aims to provide a train order holder in which a pair of resilient, loop-stretching arms are provided, there being a pair of loop-engaging jaws located between the arms, means being provided for adjusting the jaws so that they will hold the loop, against the stretching tendency of the arms.

A further object of the invention is to provide an adjusting element for the jaws which element will likewise serve as a means for holding the jaws upon the staff.

A further object of the invention is to provide novel means for retaining upon the staff, those elements wherewith the jaws are connected with the staff.

A further object of the invention is to improve generally, and to increase the efficiency of, devices of the type to which the present invention appertains.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in plan, a train order holder, constructed in accordance with the present invention; Fig. 2 is a detail enlarged from Fig. 1; Fig. 3 is a section upon the line A—B of Fig. 2; Fig. 4 is a longitudinal section of that portion of the device which appears in Fig. 3; Fig. 5 is a perspective of one end of one of the resilient, loop-stretching arms; and Fig. 6 is a transverse section upon the line C—D of Fig. 3.

In carrying out the invention there is provided as a primary and fundamental element, a staff 1, of any desired length, and preferably rectangular in contour, the staff 1 preferably being fashioned from wood. At both ends of the staff 1 there are duplicate order-holding mechanisms, but one of which will be described.

A resilient, arched member is provided, the same being preferably fashioned from spring wire. This arched member is extended through the staff 1 adjacent one end of the staff, as shown at 2. The side portions of the resilient arched member, denoted specifically by the numeral 3, fit closely in superficial grooves 4 formed longitudinally in the outer faces of the staff 1. At the end of the staff 1, the resilient member diverges, to form spaced spring arms 5, the extremities of the arms 5 preferably being curved, as shown at 6, toward the prolonged axis of the staff 1, to facilitate the removal of the loop, hereinafter described, from the arms. Shouldered fingers 7 are applied to the outer edges of the arms 5, the fingers 7 preferably being clamped upon the arms 5 by means of collars 8. The fingers 7 and the portions 6 of the arms 5 form loop-holding bifurcations at the free ends of the arms. The staff 1 is preferably rectangular in cross section and in two of its opposite side faces, the parts 3 of the resilient arched member are seated. To the other two side faces of the staff 1, plates 9 are applied. These plates 9, beyond the end of the staff 1, converge, to form loop-holding jaws 10 the extremities of the plates 9 diverging to form a loop-entering throat 11. A bolt 12 is passed through the plates 9 and through the staff 1, at some distance from the end of the staff, this bolt 12 carrying a nut 14. Adjacent its head, the bolt 12 is squared, as shown at 15, so as to register against rotation in one of the plates 9. Another bolt 16 is passed through the plates 9 adjacent the end of the staff 1. The bolt 16 is rotatable in both of the plates 9, and carries at one end, a nut 17, adapted to engage one plate. The bolt 16 fits in a groove 18 formed in the end face of the staff 1. About the plates 9 and about the portions 3 of the resilient arched member, a wrapping 18 is passed, the same preferably consisting of a helical sleeve of wire, the constituent convolutions of which may be soldered together. This wrapping 18 may be made to engage the nuts 14 and 17, as clearly shown, in order to hold these nuts against rotation.

In practical operation, a loop of cord or other flexible material, denoted by the numeral 20, is engaged between the fingers 7 and the extremities 6 of the spring arms 5, the inner, intermediate portion of the loop 20 being passed inwardly through the loop-entering throat 11, to be engaged behind the loop-holding jaws 10. The loop 20 carries the train order or other message, denoted by the numeral 21. Recalling that the arms 5 are resilient, it will be obvious that the loop 20, when disposed as shown in the drawings, will be stretched taut by the arms 5. In order that the loop 20 may not be pulled free from the jaws 10, a means is provided for adjusting the pressure of the jaws 10 against each other, so as to counteract the resilient, stretching tendency of the arms 5. This means consists of the bolt 16, registering rotatably in the open groove 18 in the end of the staff 1. If a screw-driver or like tool be applied to the head of the bolt 16, the bolt may be rotated, thereby drawing the protruding ends of the spring plates 9 together, and securing a proper coöperation between the jaws 10. As hereinbefore pointed out, the wrapping 18 holds the nut 17 against rotation, and likewise holds the nut 14 against rotation. Recalling that the bolt 12 is squared at one end, as shown at 15, to register against rotation in one of the plates 9, it is obvious that the bolt 12 cannot become disengaged from the plates 9 and from the staff 1, after the wrapping 18 is mounted in place. However, since the bolt 16 is rotatably mounted in both of the plates 9, the nut 17 being held against rotation by the wrapping 18, it will be seen that the bolt 16 may be made effective as a means for securing a proper coöperation between the jaws 10. Furthermore, since the bolt 16 registers in the open groove 18 in the end of the staff 1, the bolt 16, in addition to its function as a means for securing a coöperation of the jaws 10, has also, the function of a securing element for the plates 9, since, if the bolt 16 registers in the open groove 18, the plates 9 will be prevented from rotating upon the bolt 12.

It is to be noted that the jaws 10 are the only elements which engage the loop 20 with a gripping effect. These jaws 10 may be adjusted so as to hold the loop 20 in place, against the resiliency of the arms 5, but, at the same time, owing to the fact that there is but one pair of the jaws 10, these jaws will not interfere with the withdrawal of the loop 20, when the loop and the message 21 are withdrawn from the holder.

Owing to the fact that the staff 1 is equipped at both ends with the message-holding mechanisms hereinbefore described, it is possible, without difficulty, for the operator to stand between the tracks, and to deliver a message to each of two trains moving upon the tracks. Likewise, a message may be delivered to the engineer of a rapidly moving train, the staff 1 being reversed, to present the messages for removal by the conductor or other person, occupying a position remote from the locomotive.

When it is desired to mount the loop 20 in one pair of the arms 5, the other pair of arms may be placed in contact with the ground, the diverging relation of this last pair of arms preventing the device from slipping upon the ground, during the application of the loop. The device is further prevented from slipping, while in contact with the ground, by reason of the fact that the bifurcations 6—7 are provided.

Having thus described the invention, what is claimed is:—

1. A train order holder comprising a staff; spaced, resilient arms secured to the staff and projecting beyond one end of the staff; spring plates secured to the staff and terminating beyond the staff in coöperating jaws; a loop engaged with the jaws and engaged with, and stretched by, the arms; and an element connecting the plates at the end of the staff to adjust the jaws, whereby the jaws will hold the loop, against the resiliency of the arms.

2. A train order holder comprising a staff having an open groove in its end; spaced, resilient arms secured to the staff, the arms having bifurcations located beyond the staff; spring plates applied to the staff and terminating beyond the staff in coöperating jaws; a securing element uniting the plates with the staff; and an element connecting the plates at the end of the staff to effect an adjustment of the jaws, the connecting element registering in the groove, to prevent the plates from rotating upon the securing element.

3. A train order holder including a staff having an open groove in its end and superficial grooves in its sides; a resilient member extended through the staff and registering in the superficial grooves, said member terminating beyond the staff in resilient arms having loop-holding means; spring plates applied to the staff and terminating beyond the staff in coöperating, loop-holding jaws; a bolt extended through the staff and through the plates and held against rotation in one plate; a nut upon the bolt; a bolt uniting the plates at the end of the staff and rotatable in both plates, the bolt registering in open groove; a nut upon the last specified bolt; and a wrapping surrounding the plates and the resilient member, to hold the resilient member in the grooves, the wrapping engaging the nuts to hold the same against rotation upon the bolts.

4. A train order holder, comprising a staff; spaced, resilient arms secured to the staff and provided beyond one end of the staff with loop-holding means; spring plates secured to the staff and terminating beyond the staff in coöperating jaws adapted to hold one portion of a loop when the loop is engaged in the loop holding means; and an element connecting the plates at the end of the staff to adjust the jaws, whereby the jaws will hold the loop, against the resiliency of the arms.

In testimony that I claim the foregoing as my own, I have hereto affixed my signature in the presence of two witnesses.

JOHN MARTIN CASE.

Witnesses:
LAOMI V. PINKERTON,
N. C. SPEER.